(12) United States Patent
Koh et al.

(10) Patent No.: US 7,295,395 B2
(45) Date of Patent: Nov. 13, 2007

(54) SENSING A PRIOR TRANSDUCER POSITION BY A MOTION PATTERN

(75) Inventors: ChoonHoe Koh, Singapore (SG); HengChang Guo, Singapore (SG); WaiKhay Chan, Singapore (SG); JiaHong Shu, Singapore (SG); KianKeong Ooi, Singapore (SG); KianSoon Yeo, Singapore (SG); BengWee Quak, Singapore (SG); YuNang Zai, Singapore (SG); Kong Yaw Lucas Lee, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 179 days.

(21) Appl. No.: 10/799,510

(22) Filed: Mar. 12, 2004

(65) Prior Publication Data

US 2005/0201000 A1 Sep. 15, 2005

(51) Int. Cl.
*G11B 21/02* (2006.01)
*G11B 21/04* (2006.01)
*G11B 5/596* (2006.01)

(52) U.S. Cl. .................... 360/75; 360/70; 360/78.08

(58) Field of Classification Search ................ None
See application file for complete search history.

(56) References Cited

U.S. PATENT DOCUMENTS

| | | | |
|---|---|---|---|
| 4,458,273 A | 7/1984 | Johnson | |
| 4,736,356 A | 4/1988 | Konshak | |
| 5,313,354 A | 5/1994 | Sampietro et al. | |
| 5,384,675 A | 1/1995 | Crawforth et al. | |
| 5,493,670 A | 2/1996 | Douglis et al. | |
| 5,495,156 A | 2/1996 | Wilson et al. | |
| 5,530,602 A | 6/1996 | Boutaghou et al. | |
| 5,615,064 A | 3/1997 | Blank et al. | |
| 5,625,514 A * | 4/1997 | Kubo et al. ............. | 360/254.8 |
| 5,654,840 A | 8/1997 | Patton et al. | |
| 5,663,846 A | 9/1997 | Masuoka et al. | |
| 5,781,363 A | 7/1998 | Rowan et al. | |
| 5,789,891 A | 8/1998 | Nakane | |
| 5,825,575 A | 10/1998 | Lee | |
| 5,875,063 A | 2/1999 | Corrington et al. | |
| 5,959,814 A | 9/1999 | Mallary et al. | |
| 5,973,887 A | 10/1999 | Cameron | |
| 6,061,198 A | 5/2000 | Shrinkle | |
| 6,064,539 A | 5/2000 | Null et al. | |
| 6,088,185 A | 7/2000 | Ratliff et al. | |
| 6,104,153 A | 8/2000 | Codilian et al. | |
| 6,125,006 A | 9/2000 | Khuu | |
| 6,140,784 A | 10/2000 | Mazda | |

(Continued)

FOREIGN PATENT DOCUMENTS

EP 0224378 B1 10/1991

(Continued)

*Primary Examiner*—William Korzuch
*Assistant Examiner*—Jason Olson
(74) *Attorney, Agent, or Firm*—Fellers, Snider, et al.

(57) ABSTRACT

A motion pattern of an actuator supporting a head is monitored during/after a disc spin-up. The monitor's signal is configured to generate a digital indication of where the head was just before the spin-up. The digital indication is optionally a single-bit indicator that is used directly as a decision of whether to continue a start-up operation.

25 Claims, 5 Drawing Sheets

U.S. PATENT DOCUMENTS

| | | |
|---|---|---|
| 6,363,214 B1 | 3/2002 | Merello et al. |
| 6,498,698 B1 | 12/2002 | Golowka et al. |
| 6,574,062 B1 | 6/2003 | Bennett et al. |
| 6,674,604 B1 * | 1/2004 | Teng et al. ............ 360/78.04 |
| 6,754,027 B2 * | 6/2004 | Hirano et al. ............ 360/75 |
| 6,876,510 B2 * | 4/2005 | Heydt et al. ............ 360/75 |
| 2001/0026416 A1 | 10/2001 | Teshigawara |

FOREIGN PATENT DOCUMENTS

| | | |
|---|---|---|
| EP | 0804794 B1 | 4/1999 |
| WO | WO 03065360 A1 | 8/2003 |

* cited by examiner

SENSING A PRIOR TRANSDUCER POSITION BY A MOTION PATTERN

FIELD OF THE INVENTION

The present invention relates to a system for determining a location of a head. More particularly, the present invention relates to an improved way to determine a head's former position, following a startup operation.

BACKGROUND OF THE INVENTION

Head positioning and monitoring are important for a variety of electromechanical systems. One such system is a disc drive, in which one or more heads are configured for selective access to a respective movable surface. Disc drives are a convenient and cost-effective way to store data. They can use rigid discs coated on one or both major surfaces with a magnetizable medium for storing digital information in concentric data tracks. The disc(s) can be arranged for rotation on a spindle motor which causes the disc(s) to spin.

Heads carrying transducer elements are supported relative to the respective disc surfaces to transfer digital information to or from selected tracks. Each head creates an air bearing surface which faces the corresponding disc surface. As the disc rotates, the disc drags air onto the head along the air bearing surface in a direction approximately parallel to the tangential velocity of the disc. As the air passes beneath the air bearing surface, the pressure between the disc and the air bearing surface increases, which creates a hydrodynamic lifting force. To fly, the head generates a lifting force sufficient to overcome a preload force supplied to bias the head toward the disc surface. The hydrodynamic properties of the head are affected by the speed of rotation of the disc, the design of the air bearing surface of the head, and the preload force supplied to the head gimbal assembly.

When not in operation, each head can be parked on a designated area on the disc surface. For example, discs can include both a landing zone and a data zone on a common major disc surface. Data is stored in the data zone. Landing zones are used to support the head when the disc drive is not in operation and provide a takeoff and landing surface for the head. Such landing zones contain no data because repeat contact by the head could eventually destroy any data stored.

Textured landing zones can be used to provide a roughened surface for reducing stiction between the head and the disc surface for takeoff. Texturing is formed on a disc surface by a laser technique or other technique to provide a surface for the head to take off and land. Bumps provide lower contact area between the head and disc surface to lower the stiction force holding a stationary head to the disc surface.

Other designs use a cam or ramp to unload the head (away from the disc) when not in use. Each arm that supports a head can include a load tang, for example. A seek operation is performed that moves the head toward the cam or ramp. As the head continues this (lateral) movement, the load tang comes into contact with slides up onto the cam or ramp, lifting the head away from the disc surface as it goes.

One problem with any of these designs is the risk that the head may not be where it should on an initial power-up, or following a spin-down of unknown duration. Thus it is possible that the head may be in contact with some portion of the data surface, unlatched or in some other undesirable condition before the disc drive is readied for operation. What is needed is an effective way to monitor and diagnose such situations before a catastrophic loss of data occurs.

SUMMARY OF THE INVENTION

Systems of the present invention solve this problem by effectively monitoring where the head was before a spin-up partly based on a motion pattern observed after the spin-up. In a first embodiment, a device of the present invention includes an actuator and a position detector. The actuator is able to support a head adjacent to a rotatable disc. The position detector is constructed and arranged to determine a head's former stationary position relative to the disc based on a latter motion pattern of the actuator. Such a determination is desirably made each time a spin-up of the disc(s) occurs.

In a second embodiment, the position detector essentially consists of two parts. The first is a voice coil configured to accelerate so as to cross lines of magnetic flux in response to a current passing through the coil. This motion causes a voltage (a back EMF) to appear across the voice coil that partly depends on the speed of the motion. The second part is a circuit consisting of components rigidly mounted to a single controller board and electrically coupled across the voice coil. The components preferably include an analog-to-digital converter operatively coupled across the voice coil and configured to sample the voltage provided by the voice coil. Advantageously, devices of the second embodiment can reduce costs and enhance performance by reducing the number of discrete components and avoiding the necessity of a piezoelectric transducer or other sensor external to the voice coil motor.

In a third embodiment, one of the above-described embodiments is modified to include crash stops at one or both limits of the actuator's range of motion. Such crash stops optionally provide a reference position for a selected head on the actuator, with reference to which the head's position can be defined or determined. An actuator of the third embodiment desirably supports a plurality of additional heads adjacent at least one additional disc, the discs being mounted for co-rotation on a disc stack.

In a fourth embodiment, one of the above-described embodiments is modified to include a processor configured to retrieve a start-up program from a memory and to execute it. The start-up program then causes the processor to spin up the disc(s), then to detect the latter motion pattern, and then to generate the digital indication of where the head was just before the spin-up step. More particularly, the processor is configured to receive several voltage measurements and to derive the head's former stationary position partly based on an arithmetic combination of the measurements. The location information is preferably distilled to a single Boolean value indicating whether the head was in a normal parking position, or whether an alarm signal should be generated.

A fifth embodiment of the present invention is a method that can optionally be performed by any of the above-described embodiments. It includes a step of spinning up a data storage disc. It also includes a step of generating a digital indication of where the head was just before the spin-up step, partly based on an actuator motion pattern detected after the spin-up step.

In a sixth alternative embodiment, the fifth embodiment is modified to include steps of increasing, maintaining, decreasing, and computing. The first step is to increase a voice coil motor (VCM) current magnitude through a voice coil of the actuator to a maximum value, optionally in a substantially linear fashion. The second step is to maintain the VCM current magnitude at a nominally constant non-zero value. The third step is to decrease the VCM current magnitude substantially linearly to about zero. The last step is to compute the digital indication partly based on several voltage measurements taken across the voice coil before completing the decreasing step. Preferably the digital indication is based on several measurements taken during each of the first three steps. Note that this facilitates the determination of other calibration statistics. In a preferred embodiment, a voice coil resistance is calculated based on several measurements taken during the second step.

In a seventh embodiment, one of the above-described embodiments is modified to include preliminary steps of mounting and parking. The disc stack is first mounted with an axis of rotation so that the head is adjacent a major disc surface of the disc and so that the head has a limited range of motion. Then the head is parked on a laser-textured landing zone of the major data surface so that it is in a normal position just before the spin-up step. In another configuration the head can be parked in an "unloaded" position, so that it is supported out of contact with the disc by a pin that slides up a ramp when the head is not in use.

In an eighth alternative embodiment, the head's location is inferred based on an arithmetic combination that is not a mere sum of voltages. The location is also expressed as a single Boolean value.

A ninth embodiment of the present invention is a method that can optionally be performed by any of the above-described device embodiments that include an actuator latch, preferably a magnetic latch. It includes steps of spinning up a data storage disc and of generating a digital indication of where the head was just before the spin-up step. The indication is then used for deciding whether to search for a failure mechanism on a surface of the disc and/or whether to search for an improvement for a manufacturing process. The (conditionally improved) manufacturing process can then be used for assembling a multitude of other data storage discs into devices.

In a tenth alternative embodiment, the spin-up step includes steps of calibrating a digital offset so as to compensate for a back electromotive force before the spin-up, and of biasing the actuator with at most a few milliamperes during the spin-up. Then, a "testing force" is applied to urge the actuator away from its latched position with a "testing current" of several milliamperes. This gives the actuator an opportunity to accelerate if and only if it is not latched, which is easy to detect with or without unconventional hardware inside the system.

At least one example of each of the above-mentioned embodiments is shown and described in detail below. Additional features and benefits will become apparent upon reviewing the following figures and their accompanying description.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

To avoid needless distractions from the essence of the present invention, like-numbered reference numerals appearing in a later figure refer to the same elements as those in an earlier figure. Also, numerous aspects of basic engineering and of positioning technologies that are not a part of the present invention (or are well known in the art) are omitted for brevity. For example, this document does not articulate detailed and diverse methods for writing microcode to implement an arithmetic combination or to instruct a motor to power up. Neither does it include implementation decisions such as what exact current profile to use or how calibration values are to be used in a device initialization. Specific techniques for constructing disc stacks and spindle motors are likewise omitted, typically being a matter of design choice to those of ordinary skill in that field of technology.

Definitions and clarifications of certain terms are provided in conjunction with the descriptions below, all consistent with common usage in the art but some described with greater specificity. A "stack" is a group of mechanical elements arranged for co-rotation about a common axis, for example.

Figure 1:
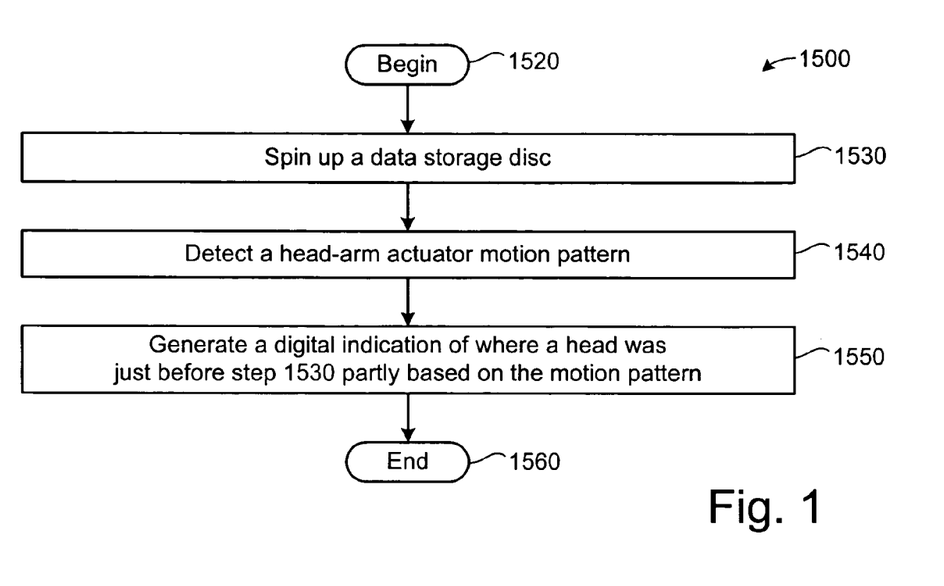
FIG. 1 shows flowchart of a novel method of the present invention.

Turning now to FIG. 1, there is shown a method 1500 that embodies the present invention, comprising steps 1520 through 1560. A motor begins to spin up the data storage disc(s) 1530. Then, a head-arm actuator motion pattern is detected 1540. Based on the motion pattern, a circuit generates a digital indication 1550 of where a head (of the actuator) was just before the spin-up step 1530.

To appreciate fully the advantages of the method 1500 of FIG. 1, it should be emphasized that difficulties have arisen in the cost-effective manufacture of data handling systems of this general type. Many of the difficulties relate to exceedingly high track pitch and precise timing requirements. For example, landing a head on several very fine data tracks is more likely to cause a catastrophic data loss than a similar landing on a smaller number of wider data tracks. This is one of the reasons it is useful to know where each head was just before spinning up a disc stack.

Figure 2:
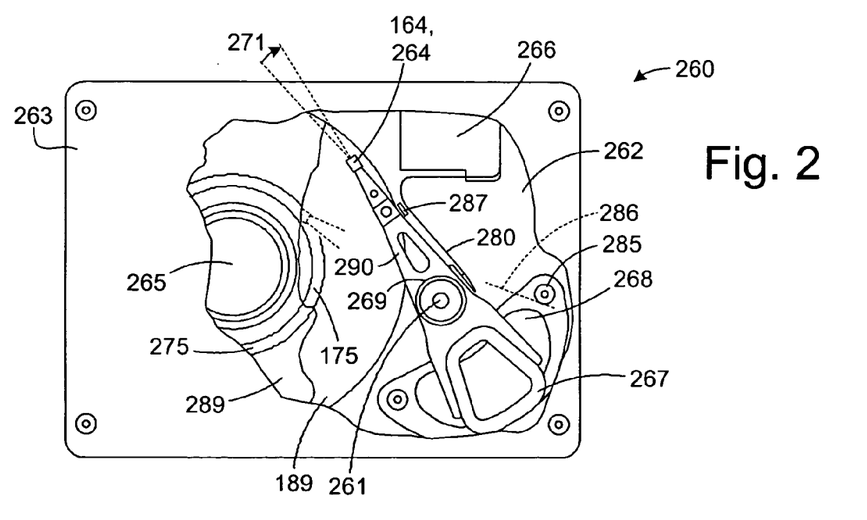
FIG. 2 shows a "top view" of a data handling system configured to perform the method of FIG. 1.

FIG. 2 shows a "top view" of a data handling system 260 that embodies the present invention, configured to perform the method 1500 of FIG. 1. (Relational terms like "top view" are arbitrary here, in that data handling systems like 260 can generally operate in any orientation.) System 260 includes "top" cover 263 that cooperates with base 262 to form a sealed chamber. Components supported in the chamber include a spindle motor 265 which rotates a stack comprising one or more data storage discs 189,289 at hundreds or thousands of revolutions per minute. Information is written to and read from data surfaces on the disc(s) 189,289 through the use of an actuator assembly 261, which rotates during a seek operation about a bearing shaft assembly 269. Actuator assembly 261 includes one or more actuator arms 290 which extend above and below each of the disc(s) 189,289, with one or more flexures 293 extending from each of the actuator arms. Mounted at the distal end of each of the flexures is a head 164,264 that can fly in close proximity adjacent the corresponding data surface of an associated disc 189,289. With at least one head 164 mounted onto it, actuator assembly 261 assembly can be called a "head-arm actuator."

Servo and user data travels through a selected one of the heads 164,264 and flex cable 280 to control circuitry on controller board 266. (Controller board 266 is configured to perform a method of the present invention shown in FIG. 1 or FIG. 10.) Flex cable 280 maintains an electrical connection by flexing as each head 164,264 seeks along its path between tracks on each of the respective major surfaces of disc(s) 189,289. During a seek operation, the overall track position of heads 164,264 is controlled through the use of a voice coil motor (VCM), which typically includes a coil 267 fixedly attached to actuator assembly 261, as well as one or more permanent magnets 268 which establish a magnetic field in which coil 267 is immersed.

The controlled application of current to coil 267 causes magnetic interaction between permanent magnets 268 and coil 267 so that coil 267 moves. As coil 267 moves, actuator assembly 261 pivots about bearing shaft assembly 269 and each of the heads 164,264 is caused to move across the respective surface of the disc(s) 189,289 between the inner diameter and outer diameter of the disc(s) 189,289. The outer diameter is bounded by a position at which one or more arms 290 of assembly 261 engage crash stop 287, which is rigidly affixed to base 262 so as to prevent heads 164,264 from sliding off their respective data surfaces. As shown, actuator 261 positions heads 164,264 very close to their respective outer diameters, causing an outward skew angle 271 of actuator assembly 261 relative to the tracks.

The inner diameter is similarly bounded by a position at which actuator assembly 261 engages crash stop 285 rigidly supported by base 262. (Note that in some embodiments described below, crash stop 285 is also configured as a magnetic latch configured to urge the actuator toward a latched position if and only if the actuator is near enough to an end of its range of motion.) Position 286 shows, with dashed lines, where actuator 261 will be when its heads 164,264 are at their respective innermost positions. Each major disc surface includes a textured landing zone 175,275 (TLZ) that supports the respective head at or near its innermost position when properly parked. Such texturing can be implemented as a pattern of asperities created with a laser, for example. This is to prevent "stiction" problems that can result from parking on a smooth surface such that of a data surface.

Figure 3:
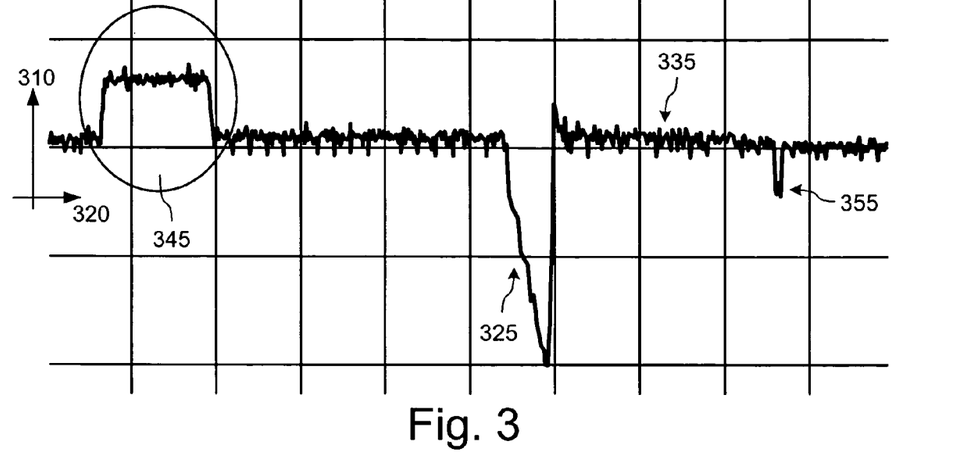
FIG. 3 shows an oscilloscope-read voltage signal across a voice coil such as that of FIG. 2.

Turning now to FIG. 3, there is shown an oscilloscope-read voltage signal across a voice coil such as coil 267 of FIG. 2. Effectively FIG. 3 is a plot of voltage 310 (in vertical units of 50 millivolts per division as shown) versus time (in horizontal units of 50 milliseconds per division as shown). An initial positive pulse 345 reflects a voltage resulting from a trapezoidal current pulse urging a head toward a parking position at one end of its range of motion. As explained below with reference to FIGS. 4-9, pulse 345 indicates that the head was properly parked before spinning up the discs. Also this trapezoidal current pulse is used for measuring the coil's resistance.

About 170 milliseconds after the initial positive pulse 345, an oppositely-directed pulse is used to urge the head away from its parking zone and toward its data zone. This is reflected in negative pulse 325. Next, voltage 310 remains stable for about 130 milliseconds, during which time the head is seeking laterally across the data zone. Finally, a smaller negative pulse 355 is detected. The smaller negative pulse 355 reflects a collision with the second crash stop that terminates the coast.

Figure 4:
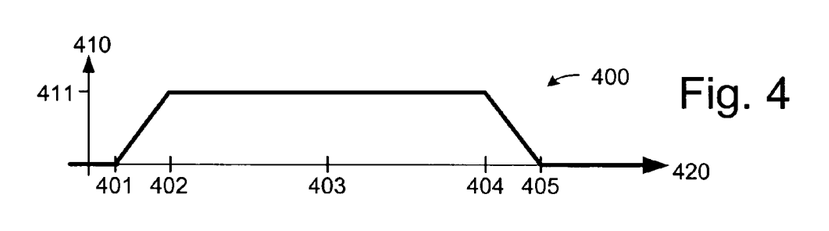
FIG. 4 shows a current plot showing an ideal trapezoidal current pulse of the same general type that was used to create the initial positive pulse of FIG. 3.

FIG. 4 shows a current plot 400 showing an ideal trapezoidal current pulse of the same general type that was used to create the initial positive pulse 345 of FIG. 3. (A slower, less practical pulse is used for clarity. Current 410 is plotted against time 420. Current 410 ramps linearly from zero to a nominal maximum value 411 from time 401 to time 402. Current remains at the nominal maximum 411 until time 404, then ramps linearly back down to zero, which is reached at time 405. The nominal midpoint of the pulse is time 403.

Figure 5:
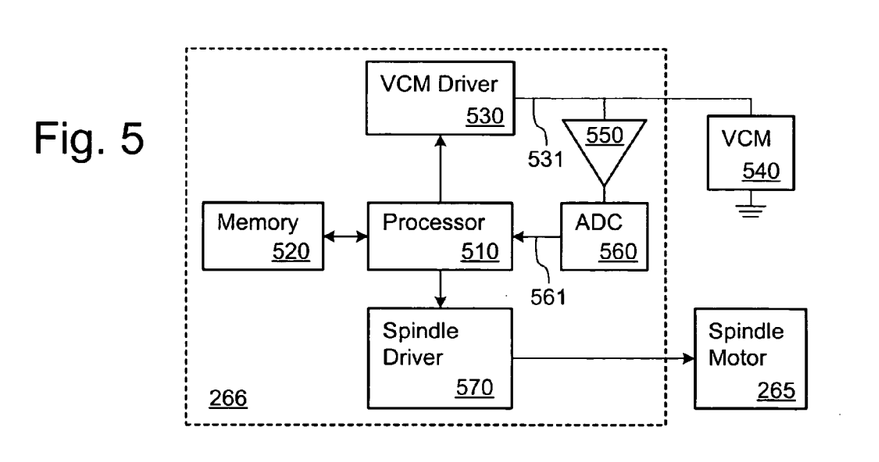
FIG. 5 shows a basic schematic diagram of the positioning systems of the data handling system of FIG. 2.

FIG. 5 shows a basic diagram of the positioning systems of the data handling system of FIG. 2. Processor 510 reads an initialization routine from memory 520, causing spindle driver 570 to spin up the discs (not shown) via spindle motor 265. Processor 510 then instructs spindle driver 530 to drive voice coil motor 540 using a current profile such as that of FIG. 4. The resulting raw signal 531 includes a component of back electromotive force (BEMF) indicative of the motion pattern of the head-arm actuator (not shown) coupled to VCM 540. Signal 531 is received through signal conditioner 550 and analog-to-digital converter 560 so as to generate a digital signal 561 indicative of the motion pattern. Processor 510 uses this digital signal 561 to ascertain the motion pattern and thereby to infer where the head was just before spinning up the spindle motor. This information is embodied in a digital signal that is then sent to the memory 520 and/or the VCM driver 530 and/or the spindle driver 570, depending on the programming of processor 510.

It should be noted that a variety of techniques can be used for extracting the BEMF information needed from raw signal 531. In a first technique, signal conditioner 550 is a unity gain buffer with an input impedance higher than 1 MΩ. A raw signal essentially like that of FIG. 3 thus passes into ADC 560 to become a series of digital samples (i.e. signal 561) that include resistive and inductive components as well as the BEMF component.

Figure 6:
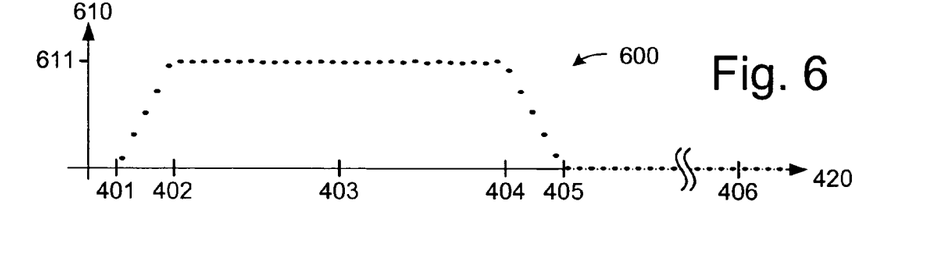
FIG. 6 shows a plot of the resistive component of an ADC-sampled voltage optionally generated from the system of FIG. 5, as a function of time.

FIG. 6 shows a plot of the resistive component 600, voltage 610 shown as a function of time 420. Component 600 is a trapezoid that ramps to a nominal maximum 611 from time 401 to 402, where it remains until time 404. Then it ramps back down to zero from time 404 until 405, where it remains until beyond time 406, 50 milliseconds later. Component 600 is thus essentially proportional to the programmed current profile from which it results (i.e. that plotted in FIG. 4).

Figure 7:
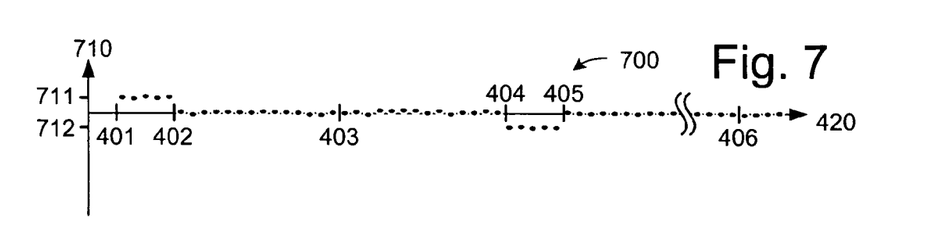
FIG. 7 shows a plot of the inductive component of the sampled voltage, also as a function of time.

FIG. 7 shows a plot of the inductive component 700, voltage 710 likewise shown as a function of time 420. Component 700 contains a pair of rectangular pulses, one at a nominal (positive) maximum 711 and the other at a nominal (negative) minimum 712. Component 700 is essentially zero between the pulses (i.e. from time 402 to time 404) and after them (i.e. for at least 50 milliseconds from time 405). Component 700 is thus essentially proportional to a derivative of the programmed current profile from which it results (i.e. that plotted in FIG. 4).

According to this first technique, processor 510 can obtain the BEMF signal by estimating the resistive and/or inductive component from the programmed current profile. The estimate(s) can then be subtracted from signal 561 to extract BEMF, an indication of an actuator's motion pattern.

According to a second technique, the VCM driver's current profile contains a series of sharp pulses alternated with short periods of near-zero current. During each of these periods between pulses, raw signal 531 essentially contains only the BEMF component. Signal 531 is amplified by signal conditioner 550 and sampled within each of the short periods to obtain a digital signal that is essentially the BEMF.

Figure 8:
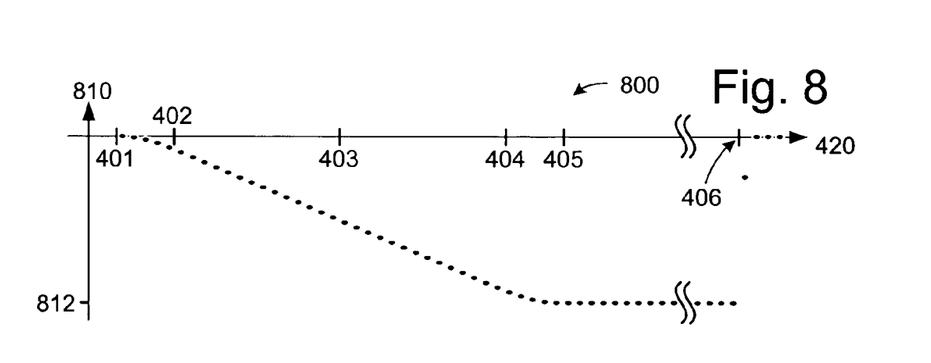
FIG. 8 shows a plot of a velocity-indicative voltage (BEMF), reflecting an actuator that travels a relatively long distance before stopping.

According to one of these techniques, or by using some other technique, processor 510 generates a signal indicative of the head's motion. FIG. 8 shows one such digital signal 800, a velocity-indicative voltage 810 plotted against time 420. (Note that signal 800 can be generated as a BEMF according to either of the above techniques, for example.)

The head-arm actuator accelerates in proportion to the steadily increasing current during the interval from time 401 to time 402. That segment of the velocity plot of FIG. 8 is thus roughly parabolic. During the interval from time 402 to time 404, current remains essentially constant, so the velocity as shown in FIG. 8 increases linearly. During the interval from time 404 to time 405, as shown in FIG. 4, current ramp down to zero. This causes the actuator's nominal acceleration to stop, after which the actuator coasts at its maximum speed (i.e. at the velocity corresponding to voltage 812) until it collides with the crash stop 50 milliseconds later, at time 406.

It can be inferred from the plot of FIG. 8 in relation to the programmed current of FIG. 4 that the actuator accelerated and coasted without obstruction until collision time 406. The distance traveled by the head after time 401 can likewise be determined by adding each of the samples of digital signal 800 (e.g. by multiplying by a calibration factor that has been determined empirically using other drives of the same design). At collision time 406, the magnitude of signal 800 drops from that of the coasting voltage 812 abruptly to near zero, as shown. This indicates that actuator assembly 261 is colliding with a crash stop, which serves as a position reference. The original position of the head (i.e. where the head was just before the spin-up step) can thus be nominally determined relative to the head's endmost position by adding the samples of signal 800 and multiplying by the above-referenced factor.

In determining where the head was just before the spin-up step, it is often sufficient to know whether the head was within a predetermined lateral zone or not. In a "safe parking verification" step, for example, processor 510 can confirm that a head was parked most recently within a textured landing zone and not within a data zone. This can be accomplished by comparing a mathematical combination of the samples of signal 800 against a predetermined threshold. One of ordinary skill can readily determine a variety of suitable combinations, and suitable mathematical criteria to apply to them, to perform such a "safe parking verification."

Figure 9:
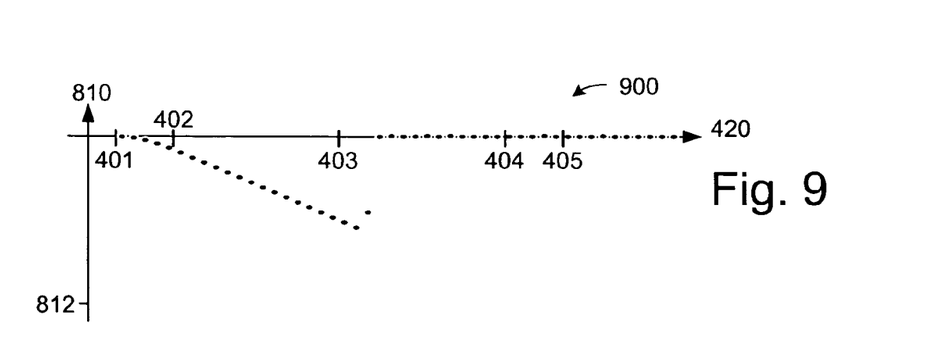
FIG. 9 shows another BEMF plot like that of FIG. 8, but reflecting an actuator that stops very shortly after beginning its motion.

FIG. 9 shows a digital signal 900 as a velocity-indicative voltage 910 plotted against time 420, similar to that of FIG. 8. In the case of FIG. 9, though, the motion of actuator assembly 261 is abruptly halted shortly after time 403 by a collision with the crash stop. Actuator assembly 261 never reaches the coasting velocity corresponding to voltage 812, in this case, because the head was parked very close to the crash stop just before the spin-up step.

Figure 10:
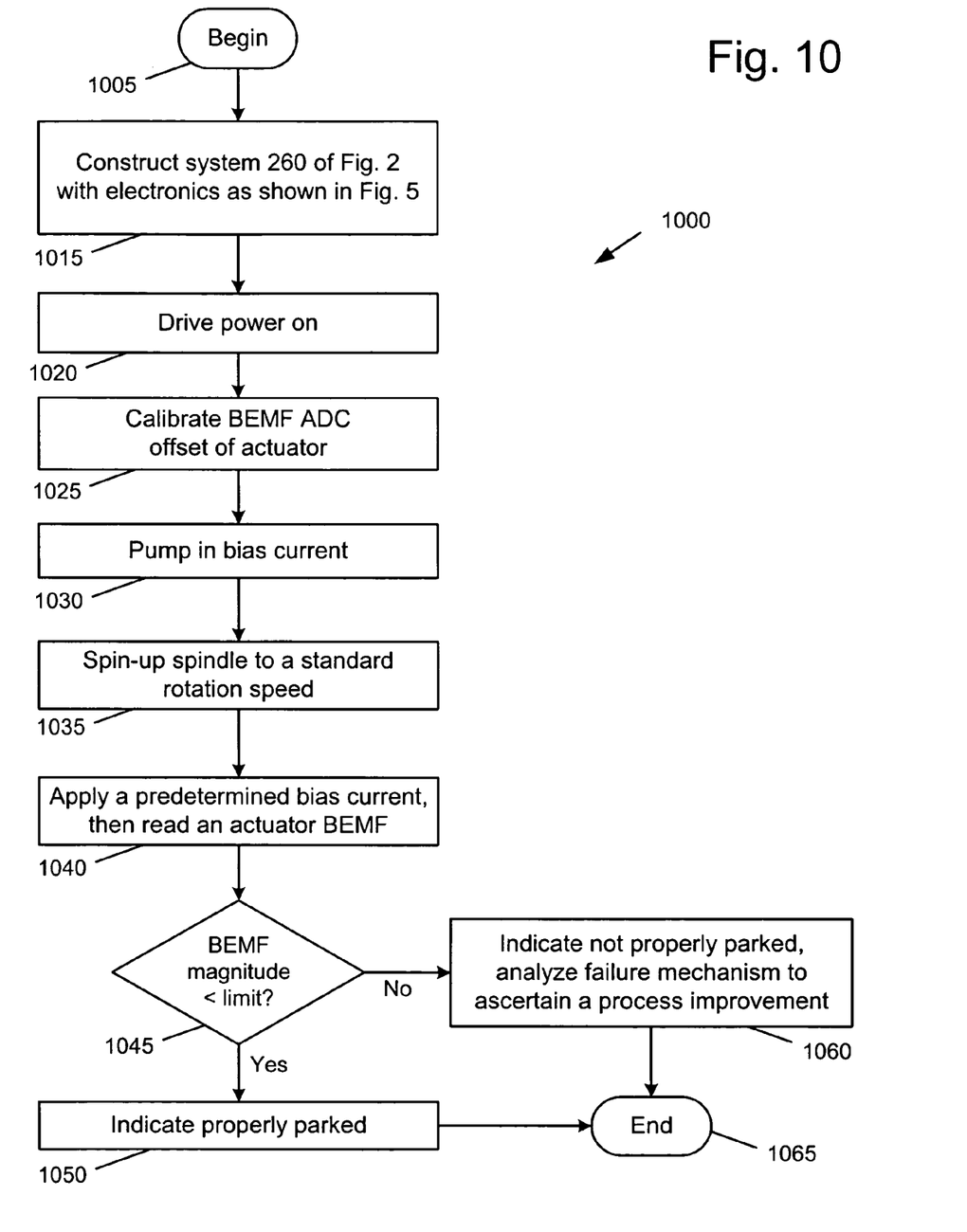
FIG. 10 shows a detailed flowchart of a preferred method of the present invention.

FIG. 10 shows a flowchart of a method 1000 that embodies the present invention, comprising steps 1005 through 1065. At step 1015, system 260 (of FIG. 2) is constructed with electronics configured as shown in FIG. 5. System 260 is powered on 1020, and processor 510 is configured to calibrate an analog-to-digital converter offset corresponding to the initial back electromotive force 1025. An initial bias current is pumped in during spin-up 1030 so as to very weakly bias the actuator away from its latched position, preferably at most a few milliamperes. The spindle is then spun up to a standard rotation speed 1035.

A second bias current is then pumped in, one that is larger but not so large as to overpower the actuator's nominal latching force, and the actuator BEMF is read 1040. If the measured BEMF magnitude is sufficiently small 1045, it can then be inferred that the actuator did not accelerate in response to the larger bias current. In this case a signal is generated so as to indicate that the actuator was properly parked 1050. Otherwise it can be inferred that the actuator apparently was improperly parked. In this case, a signal is generated to prompt an analysis of the failure mechanism and, where appropriate, a modification of the manufacturing process that is to be applied to a multitude of later-made devices 1060. This latter approach is particularly important for design certification, early in a given product's life.

Figure 11:
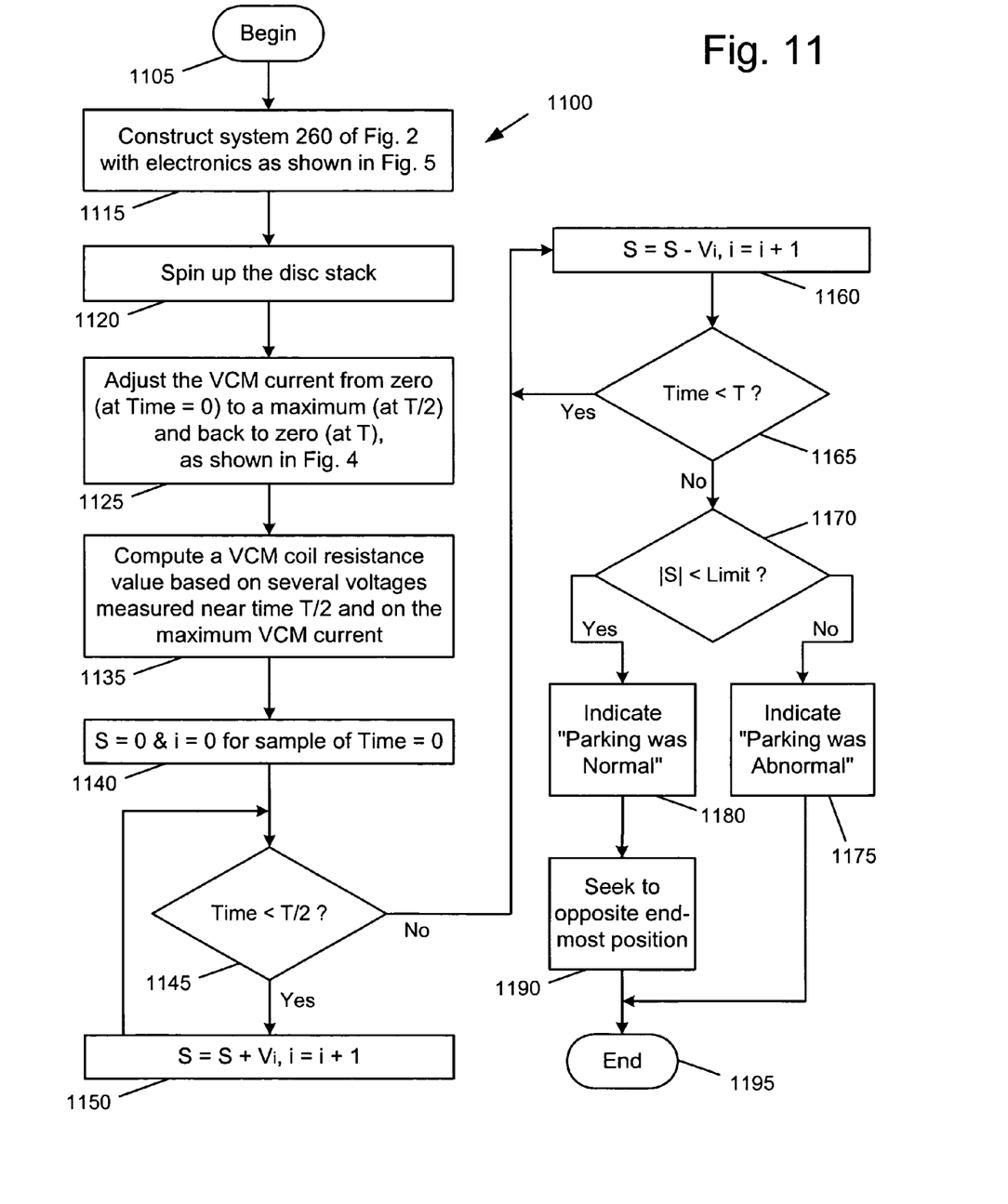
FIG. 11 shows a detailed flowchart of another preferred method of the present invention.

FIG. 11 shows a flowchart of another method 1100 of the present invention, comprising steps 1105 through 1195. In step 1115, a disc stack is mounted with an axis of rotation so that a head of a rotary actuator is adjacent a major disc surface of the disc stack and so that the head has a limited range of motion that includes innermost and outermost head positions relative to the disc stack. More particularly, the system is constructed in accordance with FIG. 2 with electromechanical components in accordance with FIG. 5, as explained above. In step 1120, the disc stack is spun up to its nominal operating speed.

Then, in step 1125, the VCM coil is energized by the pulse as shown in FIG. 4. More particularly, the VCM current is ramped up while so that the head accelerates toward the innermost head position while taking a first set of several (M=5) voltage measurements across the voice coil. The VCM current is then maintained at a nominal maximum while taking a second, larger set (N=14) of voltage measurements across the voice coil. The VCM current is further maintained at the nominal maximum while taking a third set (N=14) of voltage measurements across the voice coil. Finally, the current through the voice coil is ramped back down to about zero while taking a fourth set of (M=5) voltage measurements across the voice coil. This symmetry of pulse width and sample count is computationally convenient, especially for values of M and N larger than those given here, as shall be apparent below.

A VCM coil resistance value is computed 1135, and loop variables are initialized 1140. To implement the above-selected values of M & N, a suitable excitation pulse is selected to have duration T. So long as the excitation pulse midpoint T/2 (e.g. time 403 of FIGS. 4-9) has not been reached 1145, each new sample $V_i$ is added to the summary indicator value S and the loop counter i is incremented. Each new sample $V_i$ after the midpoint T/2 is instead subtracted from the summary indicator value S and the loop counter i is incremented 1160 so long as the excitation pulse endpoint T (e.g. time 405) has not been reached 1165. Then the magnitude of the summary indicator value S is compared against a predetermined limit 1170, the limit having been derived empirically based on the design-specified size of the landing zone. If S is smaller at step 1170, it is inferred that the head was most recently parked close enough to its innermost position (e.g. within a textured landing zone). It is therefore indicated that parking was "normal," and a normal initialization seek (to the opposite crash stop) is performed 1190. Otherwise, if S is not small enough at step 1170, the head may have been most recently parked in a position that placed user or system data at risk, and an alarm condition is indicated 1175.

Method 1100 provides a detailed, computationally efficient way to generate a digital indication of whether a head was parked in a safe position just before the spin-up step. For an initial VCM current pulse that is sufficiently short in duration, in fact, this computation is preferable for use on a digitized voltage (e.g. signal 561 of FIG. 5) that includes a resistive component. It enables the first half of the resistive component to be substantially canceled by the second half of the resistive component, as can be seen in FIG. 6. Signal conditioner 550 is optionally implememented as a unity gain buffer in such a configuration, for an application in which the resistive component is canceled and the inductive component is sufficiently small.

Although the computation method defined in method 1100 gives an exemplary method for implementing a predetermined motion pattern criterion, it will be understood that an unlimited number of other criteria are likewise available to the skilled practitioner. Variations in the arithmetic computation and/or testing are easily suited to implement the present invention, for example, and many are a matter of mere design choice in light of the teachings above.

More generally, it is to be understood that even though numerous characteristics and advantages of various embodiments have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular position monitoring application while maintaining substantially the same functionality. Although the more detailed embodiments described above relate to using the voice coil configured as a motion sensor, other applications involving other types of sensors such as piezoelectric transducers can readily benefit from these teachings without departing from the scope and spirit of the present invention.

Moreover, it will be appreciated by those skilled in the art that the selection of a suitable mathematical description of a motion pattern involves several trade-offs. The best solution will depend on the application, and except as specified in the claims, no particular solution to this trade-off is of critical importance to the present invention. A selection of designs will typically be available and readily derived, depending on the robustness and other performance characteristics required. One of ordinary skill will be able to use the above description to design and implement a variety of methods and devices using suitable mathematical descriptions in light of the teachings above, without undue experimentation.

What is claimed is:

1. A device comprising an actuator which supports a transducer, and a position detector which determines a former stationary position of the transducer based on a latter motion pattern of the actuator obtained from application of a current profile of controlled variable magnitude to the actuator, wherein the actuator comprises a voice coil which provides a voltage to the position detector that includes a back-electromotive force component indicative of a movement of the voice coil across a magnetic field, wherein the position detector detects the latter motion pattern after spin-up of a disc, and wherein the former stationary position comprises a position of the transducer prior to said spin-up.

2. The device of claim 1 in which the current profile is applied to the voice coil.

3. The device of claim 1 further comprising a latch which urges the actuator toward a predetermined position.

4. The device of claim 1 further comprising at least one crash stop which limits a range of motion of the actuator.

5. The device of claim 1 in which the former stationary position comprises a position adjacent a data storage area of a storage disc.

6. The device of claim 1 in which the position detector comprises a processor which operates to receive voltages measurements and to derive the former stationary position in relation to an arithmetic combination of the measurements.

7. The device of claim 1 in which the position detector comprises a programmable processor which operates to spin-up the disc, detect the latter motion pattern after said spin-up, and generate a digital indication of the position of the transducer prior to said spin-up in relation to said latter motion pattern.

8. The device of claim 1 in which the actuator supports a plurality of additional heads adjacent at least one additional disc, the discs being mounted for co-rotation on a disc stack.

9. The device of claim 1 in which the position detector comprises an analog-to-digital converter operatively coupled across the voice coil and samples the voltage provided by the voice coil.

10. The device of claim 1 in which the current profile comprises a first portion wherein the applied current is sequentially increased from a first value to a maximum value and a second subsequent portion wherein the applied current is sequentially decreased from the maximum value to the first value.

11. A method comprising steps of:
   spinning up a data storage disc;
   applying a drive current profile of predetermined variable magnitude to a voice coil of an actuator to initiate movement of a transducer adjacent the disc;
   detecting a motion pattern of the actuator and a back-electromotive force across the voice coil in response to said movement of the transducer; and
   generating a digital indication of a position of the transducer prior to the spinning up step in relation to the actuator motion pattern and the back-electromotive force.

12. The method of claim 11 in which the spinning up step comprises a step of mounting a disc stack comprising the data storage disc with an axis of rotation so that the transducer is adjacent a major disc surface of the disc and so that the transducer has a limited range of motion that includes innermost and outermost transducer positions relative to the axis of rotation.

13. The method of claim 11 in which the generating step comprises steps of:
   increasing a voice coil motor (VCM) current magnitude through the voice coil substantially linearly to a maximum value;
   decreasing the VCM current magnitude substantially linearly to about zero; and
   computing the digital indication in relation to voltage measurements taken across the voice coil before completing the decreasing step.

14. The method of claim 13, further comprising a step of taking at least some of the voltage measurements after the increasing step but before the decreasing step.

15. The method of claim 11 in which the generating step includes a step of seeking toward a first end-most position of the transducer.

16. The method of claim 15 in which the generating step further includes a step of estimating a resistance in relation to measurements taken during the seeking step.

17. The method of claim 11, further comprising a prior step of parking the transducer on the data storage disc.

18. The method of claim 11 in which the generating step includes a step of indicating whether the detected motion pattern met a predetermined motion pattern criterion.

19. The method of claim 11 in which the generating step includes a step of indicating whether the transducer was parked normally just before the spinning up step.

20. The method of claim 11 in which the generating step comprises steps of:
 generating a scalar measure of how far the transducer was from a reference position; and
 generating the digital indication as a Boolean value indicating whether the scalar measure exceeds a predetermined threshold.

21. The method of claim 11 further comprising a step of deciding whether to search for a failure mechanism on a surface of the disc based on the digital indication.

22. The method of claim 11 in which the drive current profile of the applying step comprises a first portion wherein the applied current is sequentially increased from a first value to a maximum value and a second subsequent portion wherein the applied current is sequentially decreased from the maximum value to the first value.

23. An apparatus comprising an actuator supporting a transducer adjacent a disc, and a position detector which determines a former position of the transducer in relation to a latter motion pattern of the actuator and in relation to a back-electromotive force across a voice coil of the actuator, wherein the former position of the transducer comprises a position prior to spin-up of the disc, and wherein the latter motion pattern and the back-electromotive force are obtained after said spin-up in response to application of a current profile of controlled variable magnitude to the voice coil.

24. The apparatus of claim 23, wherein the voice coil is configured to provide a voltage to the position detector that includes a back-electromotive force component indicative of a movement of the voice coil across a magnetic field.

25. The device of claim 23 in which the position detector comprises a programmable processor which operates to spin-up the disc, detect the latter motion pattern after said spin-up, and generate a digital indication of the position of the transducer prior to said spin-up in relation to said latter motion pattern.

* * * * *